US011053866B2

(12) United States Patent
Wickstone et al.

(10) Patent No.: US 11,053,866 B2
(45) Date of Patent: Jul. 6, 2021

(54) HYDRAULICALLY ACTUATED GASEOUS FUEL INJECTOR

(71) Applicant: WESTPORT FUEL SYSTEMS CANADA INC., Vancouver (CA)

(72) Inventors: Michael C. Wickstone, Richmond (CA); David K. Mumford, Vancouver (CA)

(73) Assignee: Westport Fuel Systems Canada Inc., Vancouver (CA)

( * ) Notice: Subject to any disclaimer, the term of this patent is extended or adjusted under 35 U.S.C. 154(b) by 0 days.

(21) Appl. No.: 16/275,555

(22) Filed: Feb. 14, 2019

(65) Prior Publication Data

US 2019/0178172 A1 Jun. 13, 2019

Related U.S. Application Data

(62) Division of application No. 15/557,772, filed as application No. PCT/CA2016/050276 on Mar. 11, 2016, now Pat. No. 10,247,112.

(30) Foreign Application Priority Data

Mar. 13, 2015 (CA) ...................................... 2884945

(51) Int. Cl.
*F02D 19/06* (2006.01)
*F02M 43/04* (2006.01)
(Continued)

(52) U.S. Cl.
CPC ............ *F02D 19/0694* (2013.01); *F02B 7/02* (2013.01); *F02D 19/0647* (2013.01);
(Continued)

(58) Field of Classification Search
CPC .. F02D 19/0694; F02D 19/0647; F02D 19/10; F02D 41/38; F02M 43/02;
(Continued)

(56) References Cited

U.S. PATENT DOCUMENTS

RE35,079 E 11/1995 Sverdlin
6,073,862 A * 6/2000 Touchette ............... F02D 19/10
239/408
(Continued)

FOREIGN PATENT DOCUMENTS

CN 1425107 A 6/2003
CN 103452721 A 12/2013
(Continued)

OTHER PUBLICATIONS

Chinese Office Action, dated May 27, 2019, for Chinese Application No. 201680027522.8, 17 pages. (with English translation).
(Continued)

*Primary Examiner* — George C Jin
(74) *Attorney, Agent, or Firm* — Seed IP Law Group LLP

(57) ABSTRACT

Hydraulically actuated gaseous fuel injectors required a relatively small pressure bias between hydraulic fluid and gaseous fuel to be able to open and to reduce hydraulic fluid contamination of the gaseous fuel. An improved hydraulically actuated gaseous fuel injector includes an injection valve in fluid communication with a gaseous fuel inlet and includes a valve member reciprocatable within a fuel injector body between a closed position and an open position. There is a lift chamber in fluid communication with a hydraulic fluid inlet such that hydraulic fluid pressure in the lift chamber contributes to an opening force applied to the valve member. A control chamber is in fluid communication with the hydraulic fluid inlet such that hydraulic fluid pressure in the control chamber contributes to a closing force applied to the valve member. A control valve is operable to reduce hydraulic fluid pressure in the control chamber such that the opening force is greater than the closing force and the valve member moves to the open position.

16 Claims, 7 Drawing Sheets

(51) Int. Cl.

| | | |
|---|---|---|
| *F02D 41/38* | (2006.01) | |
| *F02D 41/00* | (2006.01) | |
| *F02M 45/08* | (2006.01) | |
| *F02M 47/02* | (2006.01) | |
| *F02B 7/02* | (2006.01) | |
| *F02M 61/04* | (2006.01) | |

(52) U.S. Cl.
CPC ......... *F02D 41/0027* (2013.01); *F02D 41/38* (2013.01); *F02D 41/3836* (2013.01); *F02M 43/04* (2013.01); *F02M 45/083* (2013.01); *F02M 45/086* (2013.01); *F02M 47/027* (2013.01); *F02M 61/04* (2013.01); *F02D 41/0025* (2013.01); *F02D 2041/3881* (2013.01); *Y02T 10/30* (2013.01)

(58) Field of Classification Search
CPC ........ F02M 43/04; F02M 47/02; F02M 61/04; F02M 61/042; F02M 61/047; F02M 63/005; F02M 63/0026; F02M 63/0007
See application file for complete search history.

(56) References Cited

U.S. PATENT DOCUMENTS

| | | | |
|---|---|---|---|
| 6,336,598 | B1 | 1/2002 | Touchette et al. |
| 8,272,368 | B2 | 9/2012 | Wickstone |
| 8,839,763 | B2 | 9/2014 | Mittal |
| 9,366,195 | B2 * | 6/2016 | Wager ................. F02D 19/0647 |
| 2004/0069267 | A1 | 4/2004 | Hilger et al. |
| 2007/0199539 | A1 | 8/2007 | Lennox et al. |
| 2010/0199948 | A1 | 8/2010 | Rogak et al. |
| 2013/0319373 | A1 | 12/2013 | Brown et al. |
| 2014/0061326 | A1 * | 3/2014 | Coldren ............... F02M 61/045 239/5 |

FOREIGN PATENT DOCUMENTS

| | | |
|---|---|---|
| EP | 0 748 418 A1 | 9/1995 |
| WO | 2013/088428 A2 | 6/2013 |
| WO | 2017/097412 A1 | 6/2017 |

OTHER PUBLICATIONS

Chinese Search Report, dated May 9, 2019, for Chinese Application No. 201680027522.8, 5 pages. (with English translation).

European Search Report, dated Sep. 4, 2018, for European Application No. 16764083.8-1007, 8 pages.

International Search Report and Written Opinion of the International Searching Authority, dated May 17, 2016, for International Application No. PCT/CA2016/050276, 7 pages.

* cited by examiner

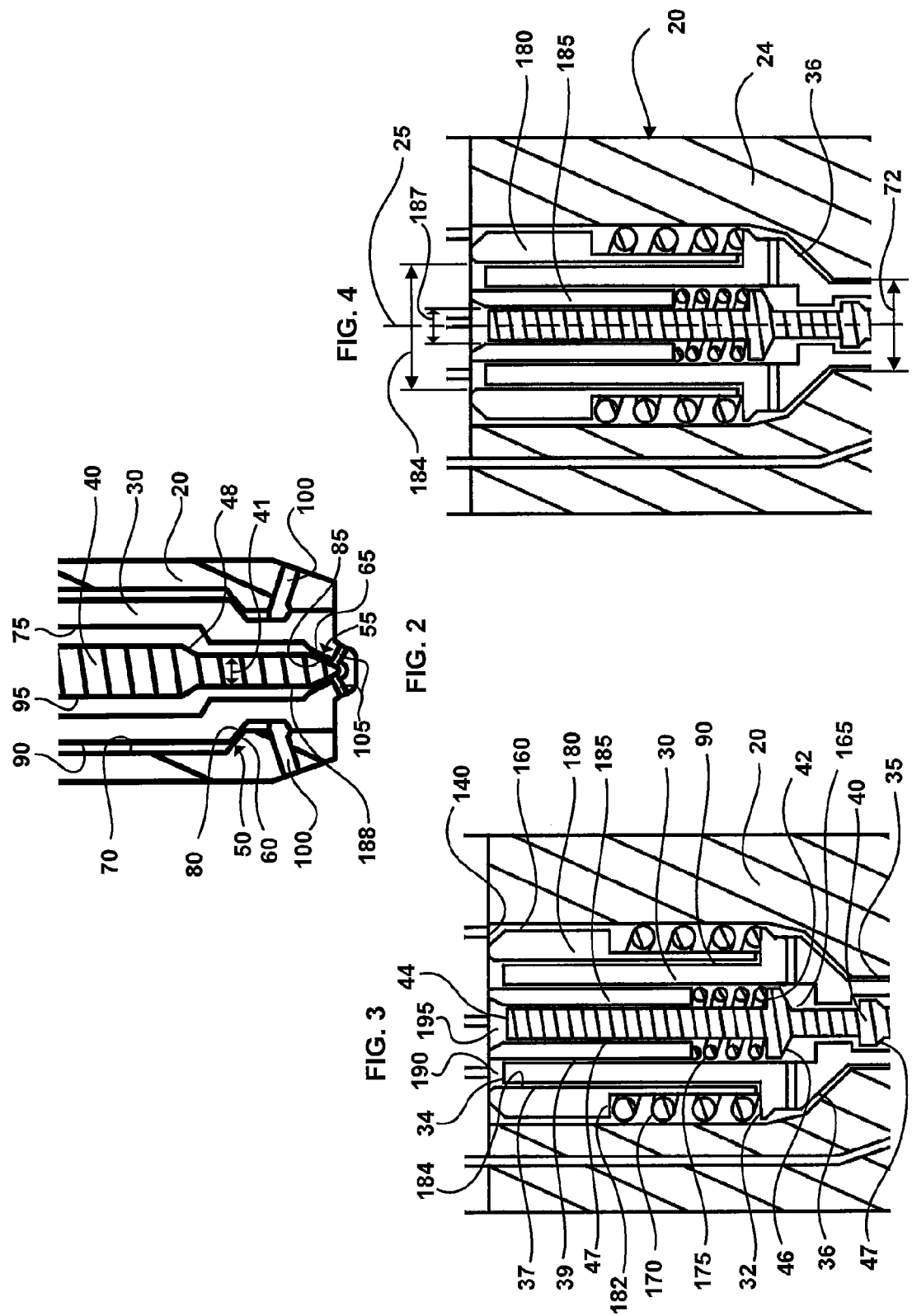

HYDRAULICALLY ACTUATED GASEOUS FUEL INJECTOR

FIELD OF THE INVENTION

The present application relates to a hydraulically actuated gaseous fuel injector for an internal combustion engine.

BACKGROUND OF THE INVENTION

Diesel engines fueled with gaseous fuel, such as natural gas, can operate at comparable power and efficiency as when fueled with diesel fuel, but at lower emissions and cost. Gaseous fuel is introduced later in the compression stroke ("late-cycle") and forms a stratified charge that burns in a diffusion combustion mode. The temperature and pressure within the combustion chamber at the end of the compression stroke is not suitable for auto-igniting the gaseous fuel when using conventional compression ratios employed in diesel engines. It is typical to employ a pilot fuel as an ignition mechanism for the gaseous fuel. A relatively small amount of the pilot fuel is injected into the combustion chamber, where the temperature and pressure are suitable for its ignition, and the combustion of the pilot fuel acts as a high energy ignition source for the gaseous fuel. It is a challenge to introduce both the gaseous fuel and pilot fuel late-cycle in engines where there is limited space in the cylinder head. In some applications there is not enough space in the cylinder head for installing separate gaseous fuel and pilot fuel injectors. This problem has been solved generally by two different techniques for integrating a gaseous fuel injector and a pilot fuel injector into one injector envelope.

One technique concentrically locates a pilot needle inside a gas needle, such as in the concentric needle dual fuel injection valve disclosed in U.S. Pat. No. 6,336,598, issued to Touchette et al. on Jan. 8, 2002, hereinafter the '598 patent. The gas needle is held in a closed position by the pressure of diesel fuel in a control chamber (in combination with a spring) acting on the gas needle. As used herein 'gas' is used interchangeably with "gaseous fuel" in this disclosure. When the fuel injector is commanded to inject gaseous fuel, a solenoid is actuated to decrease diesel pressure in the control chamber allowing the pressure of gaseous fuel in a plenum near a gas injection valve to open the needle against the reduced control chamber pressure. A match fit between the gas needle and an injector housing extends between the control chamber and the gas injection valve to reduce fluid flow between the control chamber and the plenum. A diesel fuel liquid seal is employed along the match fit, where liquid seal pressure is maintained at diesel rail pressure, which is above gas rail pressure, to prevent gaseous fuel from fluidly communicating into the control chamber when the gas injection valve is open. However, to reduce the amount of diesel fuel in the liquid seal from fluidly communicating along the match fit into the gaseous fuel at the gas injection valve, a pressure bias is maintained between diesel and gas rail pressure where diesel rail pressure is maintained within a predetermined pressure range of gas rail pressure. Certain operating modes are not possible since the pressure bias between diesel rail pressure and gas rail pressure must be maintained across all engine operating conditions. In those embodiments where control chamber pressure does not reduce to drain pressure when the fuel injector is commanded to inject gaseous fuel, it is possible that when the pressure bias is too large gaseous fuel pressure at the injection valve is not sufficient to overcome control chamber pressure preventing the gas needle from moving such that no gaseous fuel is injected.

Another technique for integrating a gaseous and pilot fuel injector integrates a pilot needle adjacent a gaseous needle in a common injector housing, such as in the side-by-side dual fuel injection valve disclosed in U.S. Pat. No. 8,839,763 issued to Mayank Mittal on Sep. 23, 2014. In this technique the gas needle is moved to an open position in a similar manner as the gas needle in the '598 patent.

The state of the art is lacking in techniques for hydraulically actuating a valve member of an injection valve in gaseous fuel injectors. The present apparatus and method provides an improved hydraulically actuated gaseous fuel injector for internal combustion engines.

SUMMARY OF THE INVENTION

An improved hydraulically actuated gaseous fuel injector for an internal combustion engine comprises a gaseous fuel inlet, a hydraulic fluid inlet and a hydraulic fluid outlet. There is an injection valve in fluid communication with the gaseous fuel inlet that includes a valve member reciprocatable within a fuel injector body between a closed position, to block gaseous fuel flow through the injection valve, and an open position to allow gaseous fuel flow through the injection valve. A lift chamber is in fluid communication with the hydraulic fluid inlet such that hydraulic fluid pressure in the lift chamber contributes to an opening force applied to the valve member. A control chamber is in one of selective fluid communication and restrictive fluid communication with the hydraulic fluid inlet such that hydraulic fluid pressure in the control chamber contributes to a closing force applied to the valve member. A control valve is operable between a blocking position to fluidly isolate the control chamber from the hydraulic fluid outlet, and an injecting position to fluidly connect the control chamber with the hydraulic fluid outlet such that hydraulic fluid pressure in the control chamber is reduced. When the control valve is in the blocking position the closing force operating on the valve member is greater than the opening force and the gas injection valve moves to and remains in the closed position. When the control valve is the injecting position the closing force operating on the valve member is less than the opening force and the gas injection valve moves to and remains in the open position. The gaseous fuel can be at least one of biogas, butane, ethane, hydrogen, landfill gas, methane, natural gas, propane, and combinations of these fuels. There can be a spring biasing the valve member to the closed position, which can assist with keeping the injection valve closed against compression and combustion chamber pressure.

In an exemplary embodiment, the control valve is a two-way valve between the control chamber and the hydraulic fluid outlet. A restricted orifice between the hydraulic fluid inlet and the control chamber allows hydraulic fluid to bleed into the control chamber. When the two-way valve fluidly connects the control chamber to the hydraulic fluid outlet, hydraulic fluid flows out of the control chamber to the hydraulic fluid outlet faster than it flows into the control chamber through the restricted orifice, and the hydraulic fluid pressure in the control chamber is reduced by an amount such that the injection valve opens. The amount that the hydraulic fluid pressure is reduced (during the injection event) is dependent upon the mass flow rate of hydraulic fluid out of the control chamber versus the mass flow rate into the control chamber.

In another exemplary embodiment, the control valve is a three-way valve. When the three-way valve is in the blocking position the control chamber is fluidly connected with the hydraulic fluid inlet and fluidly isolated from the hydraulic fluid outlet such that hydraulic fluid pressure in the control chamber increases to hydraulic fluid pressure at the inlet. When the three-way valve is in the injecting position the control chamber is fluidly isolated from the hydraulic fluid inlet and fluidly connected with the hydraulic fluid outlet such that hydraulic fluid pressure is reduced to drain pressure.

The control valve can be actuated by a solenoid-type actuator or a strain-type actuator. The solenoid-type actuator can include permanent magnets. Examples of strain-type actuators include piezoelectric actuators and magnetostrictive actuators. A match fit between the valve member and the fuel injector body extends from the lift chamber to a gaseous fuel conduit or plenum upstream of the gas injection valve. The match fit restricts fluid communication between the lift chamber and the gaseous fuel conduit, or plenum, to reduce hydraulic fluid from leaking into the gaseous fuel. However, a small amount of hydraulic fluid along the match fit is advantageous for lubricating the valve member. An annular seal associated with the match fit can be employed to reduce fluid communication through the match fit. In an exemplary embodiment, the hydraulic fluid is a liquid fuel, and a controlled amount of the liquid fuel is communicated along the match fit for at least one of lubrication and co-injection along with the gaseous fuel. The length of the match fit, an outer diameter of the valve member within the match fit and the clearance between the valve member and the fuel injector body within the match fit are selected for a predetermined pressure differential between liquid fuel pressure in the lift chamber and gaseous fuel pressure upstream from the injection valve such that the total liquid fuel introduced into the combustion chamber is less than a predetermined value In another exemplary embodiment, the gaseous fuel injector is a dual fuel injector that also separately and independently introduces a liquid fuel, and the injection valve is a gaseous-fuel injection valve and the valve member is a gaseous-fuel valve member and the control chamber is a gaseous-fuel control chamber and the lift chamber is a gaseous-fuel lift chamber. There is a liquid-fuel injection valve in fluid communication with a liquid fuel supply that includes a liquid-fuel valve member reciprocatable within a fuel injector body between a closed position, to block liquid fuel flow, and an open position to allow liquid fuel flow. A liquid-fuel lift chamber is in fluid communication with the hydraulic fluid inlet such that hydraulic fluid pressure in the liquid-fuel lift chamber contributes to an opening force applied to the liquid-fuel valve member. A liquid-fuel control chamber is in one of selective fluid communication and restrictive fluid communication with the hydraulic fluid inlet such that hydraulic fluid pressure in the liquid-fuel control chamber contributes to a closing force applied to the liquid-fuel valve member. A liquid-fuel control valve is operable between a blocking position, to fluidly isolate the liquid-fuel control chamber from the hydraulic fluid outlet, and an injecting position to fluidly connect the liquid-fuel control chamber with the hydraulic fluid outlet such hydraulic fluid pressure in the liquid-fuel control chamber is reduced. When the liquid-fuel control valve is in the blocking position the closing force operating on the liquid-fuel valve member is greater than the opening force and the liquid-fuel injection valve moves to and remains in the closed position. When the liquid-fuel control valve is the injecting position the closing force operating on the liquid-fuel valve member is less than the opening force and the liquid-fuel injection valve moves to and remains in the open position.

In an exemplary embodiment, the gaseous-fuel valve member can be a sleeve and the liquid-fuel valve member can be concentrically aligned and reciprocatable within the sleeve. Alternatively, the gaseous-fuel valve member can be adjacent the liquid-fuel valve member within the fuel injector body, in a side-by-side relationship.

In another exemplary embodiment, the liquid fuel is the hydraulic fluid, and the hydraulic fluid inlet is a liquid fuel inlet. The length of the match fit, an outer diameter of the gaseous-fuel valve member within the match fit and the clearance between the gaseous-fuel valve member and the fuel injector body within the match fit are selected for a predetermined pressure differential between liquid fuel pressure in the gaseous-fuel lift chamber and gaseous fuel pressure upstream from the gaseous-fuel injection valve such that the total liquid fuel introduced into the combustion chamber is less than 10% of total fuel consumption on an energy basis.

The liquid-fuel lift chamber can be in fluid communication with the gaseous-fuel lift chamber. Liquid fuel pressure can be maintained at a predetermined value within a range of tolerance and gaseous fuel pressure can be adjusted as a function of operating conditions of the internal combustion engine. The liquid fuel can be at least one of diesel and dimethyl ether.

An improved method for operating a hydraulically actuated gaseous fuel injector for an internal combustion engine comprises applying hydraulic fluid pressure on a valve member of an injection valve that contributes to a closing force acting on the valve member; applying hydraulic fluid pressure on the valve member that contributes to an opening force acting on the valve member; opening the injection valve by decreasing the hydraulic fluid pressure that contributes to the closing force such that the closing force is less than the opening force and the valve member moves to an open position; and closing the injection valve by increasing the hydraulic fluid pressure that contributes to the closing force such that the closing force is greater than the opening force and the valve member moves to a closed position.

In an exemplary embodiment, the hydraulic fluid is a liquid fuel. The method further comprises co-injecting a predetermined amount of the liquid fuel through the injection valve with the gaseous fuel.

In another exemplary embodiment, the gaseous fuel injector is a dual fuel injector that further introduces a liquid fuel separately and independently from the gaseous fuel, and the injection valve is a gaseous-fuel injection valve and the valve member is a gaseous-fuel valve member. The method further comprises applying hydraulic fluid pressure on a liquid-fuel valve member of a liquid-fuel injection valve that contributes to a closing force acting on the liquid-fuel valve member; applying hydraulic fluid pressure on the liquid-fuel valve member that contributes to an opening force acting on the liquid-fuel valve member; opening the liquid-fuel injection valve by decreasing the hydraulic fluid pressure that contributes to the closing force wherein the closing force is less than the opening force whereby the liquid-fuel valve member moves to an open position; and closing the liquid-fuel injection valve by increasing the hydraulic fluid pressure that contributes to the closing force wherein the closing force is greater than the opening force whereby the liquid-fuel valve member moves to a closed position. In an exemplary embodiment, the method can comprise maintaining liquid fuel pressure at a predetermined set-point value within a predetermined range of tolerance; and adjusting gaseous fuel pressure as a function of engine operating conditions.

BRIEF DESCRIPTION OF THE DRAWINGS

FIG. 2 is a detail view of a lower section of a nozzle of the fuel injector of FIG. 1.

FIG. 3 is a detail view of an upper section of a nozzle of the fuel injector of FIG. 1.

FIG. 4 is a detail view of the lower section of a nozzle of the fuel injector of FIG. 1.

DETAILED DESCRIPTION OF PREFERRED EMBODIMENT(S)

Figure 1:
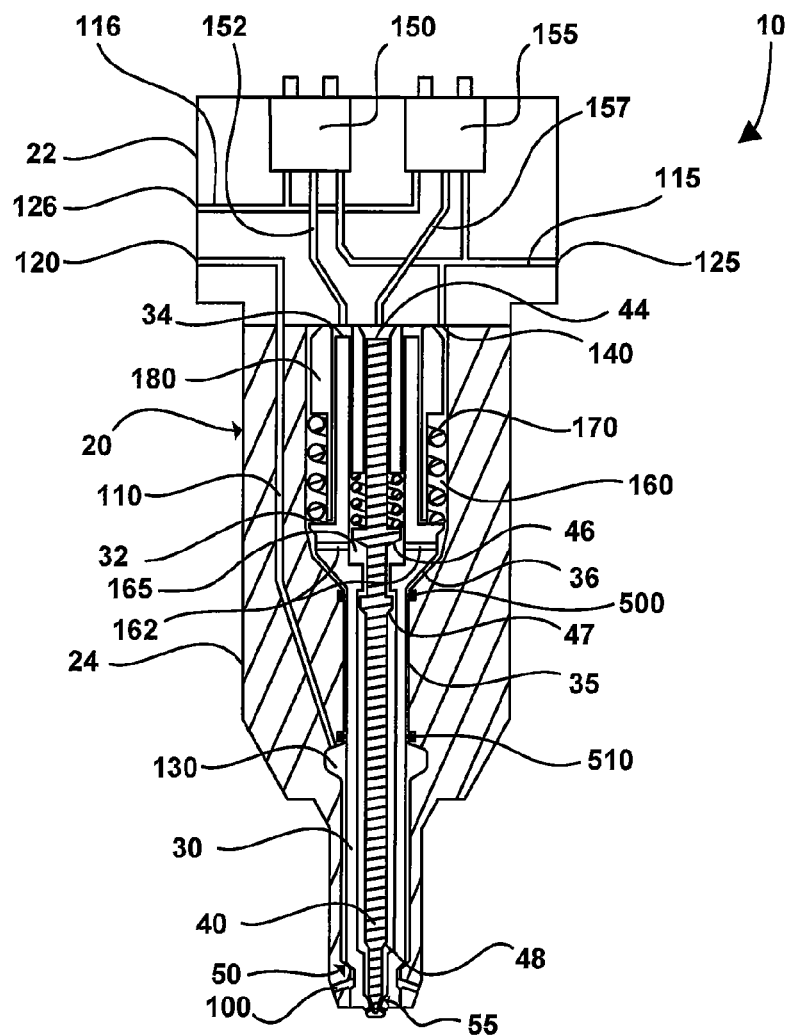
FIG. 1 is a cross-sectional schematic view of a hydraulically actuated gaseous fuel injector that can introduce a gaseous fuel and a liquid fuel separately and independently into a combustion chamber of an internal combustion engine according to a first embodiment where a liquid-fuel valve member is concentrically aligned within a gaseous-fuel valve member.

Referring generally to FIGS. 1, 2 and 3, there is shown concentric-needle dual fuel injector 10 according to a first embodiment that introduces a gaseous fuel and a liquid fuel separately and independently directly into a combustion chamber of an internal combustion engine (not shown). A gaseous fuel is any fuel that is in a gas state at standard temperature and pressure, which in the context of this application is defined to be 0 degrees Celsius (.degree. C.) and 1 bar respectively. Exemplary gaseous fuels include biogas, butane, ethane, hydrogen, landfill gas, methane, natural gas, propane and combinations of these fuels. A liquid fuel is any fuel in the liquid state at standard temperature and pressure. In an exemplary embodiment, fuel injector 10 is employed in a Diesel-cycle internal combustion engine where the liquid fuel is compression ignitable such that its combustion creates an environment in combustion chambers where the pressure and temperature are suitable for the ignition of the gaseous fuel. Exemplary liquid fuels that are compression ignitable include diesel and dimethyl ether (DME).

Injector 10 includes injector body 20 within which are concentrically aligned and reciprocatable valve members referred to as gas needle 30 and liquid needle 40 herein. Valve member and needle are used interchangeably throughout this disclosure. Upper portion 22 of injector body 20 includes gaseous fuel inlet 120 and liquid fuel inlet 125. Although fuel inlets 120 and 125 are illustrated as separate side entry fuel inlets, in other embodiments separate top entry fuel inlets can be employed. Alternatively, instead of separate gaseous and liquid fuel inlets, a common fuel inlet can be employed that mutually engages a dual fuel connector such as the one disclosed in U.S. Pat. No. 8,272,368, issued on Sep. 25, 2012, which can be arranged to connect along the side of injector body 20 or the top thereof. Other types of dual fuel connectors, which are also known as fuel swords or fuel spears, can be used in alternative embodiments. In the illustrated embodiment, liquid fuel is employed both as fuel to be injected into the combustion chamber and as a hydraulic fluid for moving gas and liquid needles 30 and 40 when they are made to move by gas and liquid actuation mechanisms 150 and 155 respectively, as will be described in more detail below. In this regard, inlet 125 can be referred to as hydraulic fluid and liquid fuel inlet 125. Hydraulic fluid outlet 126 is a drain for that portion of the liquid fuel in injector 10 that is employed as hydraulic fluid, and is fluidly connected with gas and liquid actuation mechanisms 150 and 155 through hydraulic fluid drain conduit 116. Hydraulic fluid herein refers to a liquid that moves within a confined space under pressure for generating hydraulic forces. Lower portion 24 of injector body 20 is also known as a nozzle to those familiar with the technology.

Gas needle 30 is operable for reciprocating movement within injector body 20 for opening and closing gas injection valve 50 (best seen in FIG. 2) formed between annular shoulder 60 on interior surface 70 of nozzle 24 and annular shoulder 80 on outer surface 90 of gas needle 30. Downstream from gas injection valve 50 are gas orifices 100 that fluidly communicate gaseous fuel into the combustion chamber when the gas injection valve is open. Although two gas orifices are illustrated in the figures, in other embodiments any number of gas orifices can be employed to achieve the fuel flow rate and spray pattern required by the respective embodiment. Referring again to FIG. 1, upstream of gas injection valve 50 is gaseous fuel conduit 110 that directs gaseous fuel from gaseous fuel inlet 120 to annular gas plenum 130, which serves as a gas accumulator within the injector and is in fluid communication with the gas injection valve. With reference to FIG. 3, spring 170 extends between annular shelf 182 of sleeve 180 and annular shelf 32 that protrudes from outer surface 90 of gas needle 30. Spring 170 is employed to bias gas injection valve 50 towards a closed position where surface 80 abuts surface 60 (seen in FIG. 2). Although illustrated as a helical compression spring, spring 170 can be other types of springs such as one or more disc springs or a bellows spring, for example. Upper annular surface 34 in control chamber 190 when acted upon by hydraulic fluid results in a closing force urging gas needle 30 to the closed position for gas injection valve 50. Outer surface 90 of the gas needle in lift chamber 160 is acted upon by hydraulic fluid resulting in an opening force urging the gas needle to the open position for gas injection valve 50. Annular match fit 37 between gas needle 30 and sleeve 180 extends from upper annular surface 34 to annular shelf 32, and acts as a needle guide and to restrict fluid communication of liquid fuel between control chamber 190 and lift chamber 160, which is the space between injector body 20 and gas needle 30 in and around spring 170 and lower annular surface 36, also referred to interchangeably herein as annular passageway 160. Hydraulic fluid pressure is employed in control chamber 190 to close gas injection valve 50 and in lift chamber 160 to open the gas injection valve, as will be described in more detail below. Referring again to FIG. 1, annular match fit 35 between gas needle 30 and injector body 20 extends from lift chamber 160 in the vicinity of lower annular surface 36 to gas plenum 130, and acts as a guide for the gas needle and to restrict fluid communication between the lift chamber and the gas plenum, especially of liquid fuel into the gas plenum since liquid fuel pressure is typically greater than gaseous fuel pressure. When hydraulic pressure in lift chamber 160 is greater than gaseous fuel pressure in plenum 130, gas will not communicate along match fit 35 into the lift chamber due to the pressure differential therebetween, and in this regard lift chamber 160 in combination with match fit 35 forms a fluid seal.

Liquid needle 40 is operable for reciprocating movement within sleeve-shaped gas needle 30 for opening and closing liquid injection valve 55 (best seen in FIG. 2). Liquid injection valve 55 is formed between annular shoulder 65 on interior surface 75 of gas needle 30 and annular shoulder 85 on outer surface 95 of liquid needle 40. Downstream from liquid injection valve 55 are liquid orifices 105 that fluidly communicate liquid fuel into the combustion chamber when the liquid injection valve is open. Although two liquid orifices are illustrated in the figures, in other embodiments any number of liquid orifices can be employed to achieve the fuel flow rate and spray pattern requirements of the respective embodiment. Referring again to FIG. 1, upstream of liquid injection valve 55 is hydraulic fluid and liquid fuel conduit 115 that begins at inlet 125 and is employed to distribute hydraulic fluid to gas and liquid actuation mechanisms 150 and 155 respectively, and hydraulic fluid and liquid fuel to entry port 140 of lower portion 24. Conduit 115 is referred to herein interchangeably as the hydraulic fluid conduit and the liquid fuel conduit. With reference to FIG. 3, spring 175 extends between sleeve 185 and annular shelf 42 protruding from liquid needle 40. Spring 175 is employed to bias liquid injection valve towards a closed position where annular surface 85 abuts annular surface 65 (seen in FIG. 2). Although illustrated as a helical compression spring, spring 175 can also be other types of springs as described above with respect to spring 170. End surface 44 of liquid needle 40 in control chamber 195 when acted upon by hydraulic fluid results in a closing force urging the liquid needle to the closed position for liquid injection valve 55. Annular match fit 47 between liquid needle 40 and sleeve 185 extends from control chamber 195 to spring 175 and serves to restrict the flow of liquid fuel between control chamber 195 and lift chamber 165, which is the space between gas needle 30 and the liquid needle below match fit 47. Outer surface 95 of the liquid needle in lift chamber 165 is acted upon by hydraulic fluid resulting in an opening force urging the liquid needle to the open position for liquid injection valve 55. Annular match fit 39 between gas needle 30 and sleeve 185 extends from control chamber 190 to spring 175 and acts to restrict fluid communication of liquid fuel between the control chamber and lift chamber 165. In the illustrated embodiment, high pressure liquid fuel flows from conduit 115 through entry port 140 into annular passageway 160 that extends between injector body 20 and both sleeve 180 and gas needle 30 to match fit 35 adjacent lower annular surface 36. Passageways 162 in gas needle 30 extend from passageway 160 to lift chamber 165, which is upstream from and fluidly connected with liquid injection valve 55.

Referring generally to FIGS. 1, 3 and 4, gas actuation mechanism 150 is actuatable to switch the fluid connection of gas control conduit 152 between high pressure hydraulic fluid conduit 115 and low pressure drain conduit 126. In an exemplary embodiment gas actuation mechanism 150 includes an actuator and a three-way control valve that is switchable by the actuator. The actuator can be a solenoid-type actuator or a strain-type actuator, such as a piezoelectric or a magnetostrictive actuator. In the illustrated embodiment, when gas actuation mechanism 150 is not energized the control valve is in a blocking position where gas control conduit 152 is in fluid communication with hydraulic fluid conduit 115 such that the pressure in control chamber 190 is equal to pressure in lift chamber 160, and the closing force is greater than the opening force acting on gas needle 30, and gas injection valve 50 moves to and/or remains in a closed position. The primary contributing closing force is the hydraulic force exerted on upper annular surface 34 (herein also referred to as a gas-needle closing surface) in control chamber 190. The primary contributing opening force is a hydraulic force exerted on outer surface 90 of gas needle 30 between inner diameter 184 of sleeve 180 and inner diameter 72 of lower portion 24 of the injector body (seen in FIG. 4) in lift chamber 160, herein also referred to as a gas-needle opening surface. The mechanical closing force of spring 170 is not a requirement for closing gas injection valve 50, and the balance between all hydraulic and pneumatic opening and closing forces determines whether the spring force is required to close the gas injection valve. The mechanical closing force of spring 170 can assist with keeping gas injection valve 50 closed against compression and combustion forces in combustion chambers acting on fuel injector 10. There can be other contributing opening and closing forces acting on gas needle 30, such as hydraulic forces acting on the gas needle within lift chamber 165 and pneumatic forces due to gaseous fuel pressure upstream of gas injection valve 50; however the contribution from these forces towards gas needle motion is less compared to the forces described above, and these contributing forces are not adjusted to effect motion of the gas needle. As used herein, pneumatic fluid refers to a gas that moves within a confined space under pressure for generating pneumatic forces. When gas actuation mechanism 150 is actuated, the control valve is in an injecting position where gas control conduit 152 is in fluid communication with low pressure drain conduit 126 such that the hydraulic fluid pressure in control chamber 190 is equal to drain pressure, which is less than hydraulic fluid pressure in lift chamber 160, and the closing force is less than the opening force acting on gas needle 30, and gas injection valve 50 moves to and/or remains in an open position.

Referring generally to FIGS. 1 to 4, liquid actuation mechanism 155 is actuatable to switch the fluid connection of liquid control conduit 157 between high pressure hydraulic fluid conduit 115 and low pressure drain conduit 126. In an exemplary embodiment liquid actuation mechanism 155 includes an actuator and a three-way control valve that is switchable by the actuator. The actuator can be a solenoid-type actuator or a strain-type actuator, such as a piezoelectric or a magnetostrictive actuator. In the illustrated embodiment, when liquid actuation mechanism 155 is not energized the control valve is in a blocking position where liquid control conduit 157 is in fluid communication with hydraulic fluid conduit 115 such that the pressure in control chamber 195 is equal to pressure in lift chamber 165, and the closing force is greater than the opening force acting on liquid needle 40, and liquid injection valve 55 moves to and/or remains in a closed position. The primary contributing closing force is the hydraulic force exerted on end surface 44

(herein also referred to as a liquid-needle closing surface) in control chamber 195. The primary contributing opening force is the hydraulic force exerted on outer surface 95 of liquid needle 40 between outer diameter 187 and inner diameter 188 of the liquid needle in lift chamber 165 (herein referred to as a liquid-needle opening surface). The mechanical closing force of spring 175 is not a requirement for closing liquid injection valve 55, and the balance between all hydraulic opening and closing forces determines whether the spring force is required to close the liquid injection valve. The mechanical closing force of spring 175 can assist with keeping liquid injection valve 55 closed against compression and combustion forces in combustion chambers acting on fuel injector 10. When liquid actuation mechanism 155 is actuated, the control valve is in an injecting position where liquid control conduit 157 is in fluid communication with low pressure drain conduit 126 such that the hydraulic fluid pressure in control chamber 195 is equal to drain pressure, which is less than hydraulic fluid pressure in lift chamber 165, and the closing force is less than the opening force acting on liquid needle 40, and liquid injection valve 55 moves to and/or remains in an open position.

As described in the illustrated embodiment of FIGS. 1 through 4, liquid fuel from inlet 125 is employed both as a hydraulic fluid to create hydraulic opening and closing forces on needles 30 and 40, and as a liquid fuel for injection into a combustion chamber. In alternative embodiments, a separate hydraulic fluid can be employed. In these embodiments, there would be a separate hydraulic fluid inlet and a separate liquid fuel inlet, and injection valve 55 would be fluidly isolated from lift chamber 165.

Fuel injector 10 does not require a liquid seal along match fit 35 to reduce the likelihood of gaseous fuel in plenum 130 from fluidly communicating into lift chamber 160 since hydraulic fluid pressure in the lift chamber is greater than gaseous fuel pressure in the plenum. This is unlike previous gaseous fuel injectors that required a liquid seal to prevent gaseous fuel from fluidly communicating between a plenum and a control chamber, since the control chamber pressure could be less than gaseous fuel pressure. The complexity of the fuel injector is reduced when the liquid seal is not required. A small amount of liquid fuel is communicated through match fit 35 to gas plenum 130, as a result of the pressure differential between liquid and gaseous fuels. This helps to lubricate the match fit and improves reciprocation of gas needle 30. By increasing the length of match 35, the amount of liquid fuel that is communicated into gas plenum 130 can be reduced, which is preferable. Alternatively, by increasing the length of match fit 35, the pressure differential between liquid and gaseous fuels can be increased for the same mass flow rate of liquid fuel through the match fit into gas plenum 130, which allows an advantageous operating mode as will be described in more detail below.

Lower portion 24 can include annular seal 500 and/or annular seal 510 (seen in FIG. 1) to reduce fluid communication along match 35, although this is not a requirement. In exemplary embodiments, annular seals 500 and 510 can be o-ring seals, an energized seal, bellow seals or sealing bushings. Normally, liquid fuel pressure in lift chamber 160 is higher than gaseous fuel pressure in plenum 130, and a pressure gradient across match fit 35 exists such that liquid fuel is communicated along the match fit into the gas plenum. Although a small amount of liquid fuel communicating through match fit 35 is advantageous to lubricate gas needle 30, reducing wear and improving the reciprocation of the gas needle, it is preferable to reduce the amount of liquid fuel that communicates through the match fit to improve fuelling accuracy of the injector. Any hydraulic fluid (which in the case of the illustrated embodiment of FIG. 1 is a liquid fuel) that fluidly communicates into gas plenum 130 will be injected along with the gaseous fuel when gas injection valve 50 is in the open position.

In an exemplary embodiment the length of match fit 35, the outer diameter of gas needle 30 within the match fit, and the radial clearance between the gas needle and injector body 20 within the match fit are selected for a predetermined pressure differential between liquid fuel pressure in lift chamber 160 and gaseous fuel pressure in plenum 130 such that the total liquid fuel introduced into the combustion chamber is less than 10%, and preferably less than 5%, of the total fuel introduced on an energy basis. The Hagen-Poiseuille equation can be employed to determine the volumetric flow rate through match fit 35, from which the mass flow rate can be determined. The total fuel introduced can be determined over a typical use profile of the fuel injector and engine or per injection event, for example. Liquid fuel is introduced through both liquid injection valve 55, as a pilot injection, and gas injection valve 50 as leakage through match fit 35. In still further exemplary embodiments, the pressure differential can be at least 10 bar, but preferably it is at least 40 bar, and even more preferably 50 bar.

Figure 5:
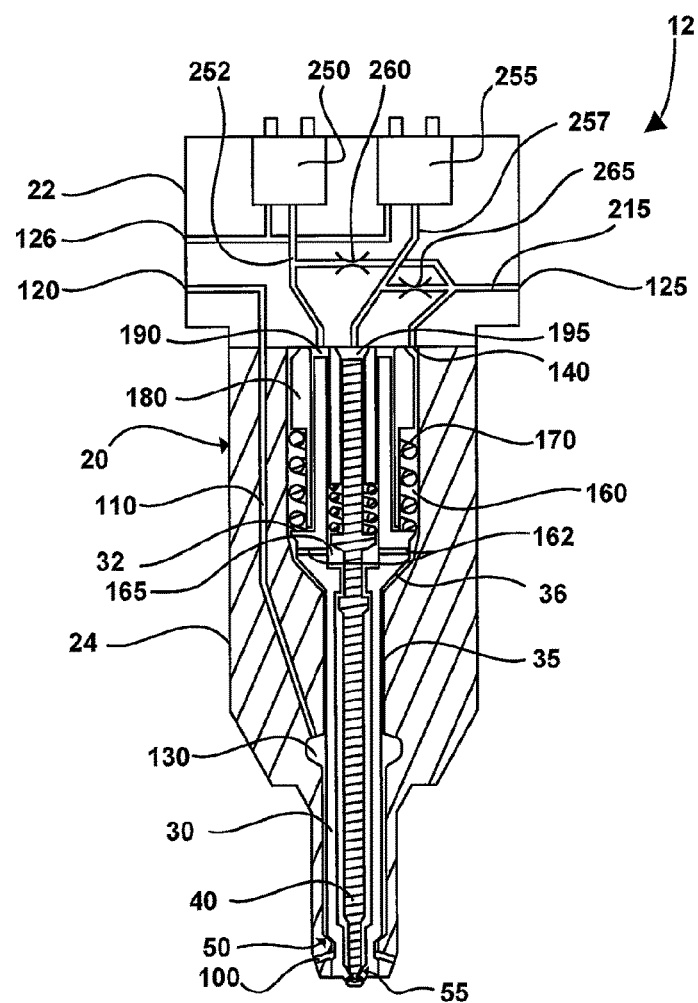
FIG. 5 is a cross-sectional schematic view of a hydraulically actuated gaseous fuel injector that can introduce a gaseous fuel and a liquid fuel separately and independently into a combustion chamber of an internal combustion engine according to a second embodiment.

Referring now to FIG. 5, fuel injector 12 is illustrated according to a second embodiment, where like reference numerals in the previous and subsequent embodiments indicate like parts and may not be described in detail if at all. Gas and liquid actuation mechanisms 250 and 255 each include a two-way control valve and an actuator (for switching the two-way control valve), compared to actuation mechanisms 150 and 155 that each include a three-way control valve and an actuator. Gas and liquid control conduits 252 and 257 are each in fluid communication with hydraulic fluid and liquid fuel conduit 215 through restricted orifices 260 and 265 respectively, which restrict the flow of hydraulic fluid into the control conduits. As in the previous embodiment, the liquid fuel acts as a hydraulic fluid. When the actuator in gas actuation mechanism 250 is not energized, the two-way control valve is in a blocking position where control conduit 252 is in fluid communication with hydraulic fluid conduit 215 through restricted orifice 260 and the hydraulic fluid pressure in control chamber 190 and lift chamber 160 is equal. When the actuator in gas actuation mechanism 250 is energized, the two-way control valve is in an injecting position where gas control conduit 252 is in fluid communication with drain conduit 126, such that hydraulic fluid pressure in control chamber 190 equals drain pressure (which is less than hydraulic fluid pressure in lift chamber 160), since hydraulic fluid cannot enter the gas control conduit through the restricted orifice as fast as it exits through the drain conduit. Similarly, when the actuator in liquid actuation mechanism 255 is not energized then liquid control conduit 257 is in fluid communication with hydraulic fluid conduit 215 through restricted orifice 265 and the hydraulic fluid pressure in control chamber 195 and lift chamber 165 is equal. When the actuator in liquid actuation mechanism 255 is energized, the two-way valve therein fluidly connects control conduit 257 with drain conduit 126, such that hydraulic fluid pressure in control chamber 195 equals drain pressure (which is less than hydraulic fluid pressure in lift chamber 165), since hydraulic fluid cannot enter the liquid control conduit through the restricted orifice as fast as it exits through the drain conduit. The two-way valves in actuation mechanisms 250 and 255 are less complex and expensive compared to the three-way valves in actuation mechanisms 150 and 155 (seen in FIG. 1). However, the three-way valves allow a greater reduction in pressure in control chambers 190 and 195 and allow for faster gas and liquid needle opening rates. Since hydraulic fluid pressure in lift chamber 160 is employed to move the gas needle, gaseous fuel pressure in gaseous fuel conduit 110 can be any value less than liquid fuel pressure in liquid conduit 215 and gas injection valve 50 can still be actuated between the open and closed positions, unlike previous dual fuel injectors where the liquid fuel pressure had to be within a predetermined margin of gaseous fuel pressure for the valve to open. There are operating modes for the internal combustion engine where it is advantageous to employ a liquid rail pressure that is substantially higher than a gas rail pressure, as will be described in more detail below.

Figure 6:
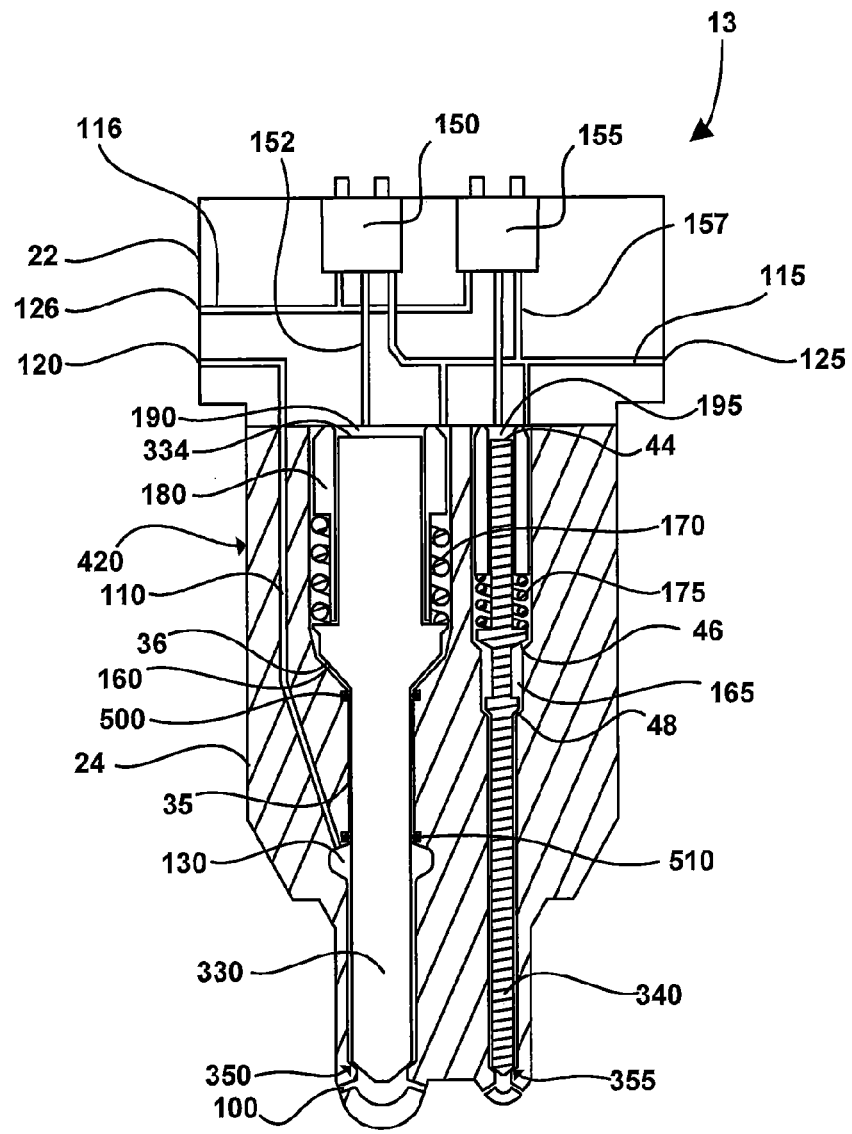
FIG. 6 is a cross-sectional schematic view of a hydraulically actuated gaseous fuel injector that can introduce a gaseous fuel and a liquid fuel separately and independently into a combustion chamber of an internal combustion engine according to a third embodiment where a gaseous-fuel valve member is adjacent a liquid-fuel valve member.

Referring to FIG. 6, hydraulically actuated gaseous fuel injector 13 is illustrated according to a third embodiment. Fuel injector 13 is a dual fuel injector that further introduces a liquid fuel separately and independently from the gaseous fuel. Gas needle 330 is adjacent liquid needle 340 within fuel injector body 320, in a side-by-side relationship, compared to the concentric-needle relationship of fuel injectors 10 and 12 in FIGS. 1 and 5. Gas injection valve 350 is opened by decreasing hydraulic fluid pressure in control chamber 190 such that hydraulic fluid pressure in lift chamber 160 moves gas needle 330 in the same manner as gas injection valve 50 in FIG. 1 is opened. Liquid injection valve 355 is opened by decreasing hydraulic fluid pressure in control chamber 195 such that hydraulic fluid pressure in lift chamber 165 moves liquid needle 340 in the same manner as liquid injection valve 55 in FIG. 1 is opened. In those applications where the space in the cylinder head above the combustion chamber is constrained, fuel injectors 13 can be employed advantageously instead of separate injectors for gaseous fuel and for liquid fuel, although fuel injectors 10 and 12 require even less cylinder head space compared to injector 13.

Figure 7:
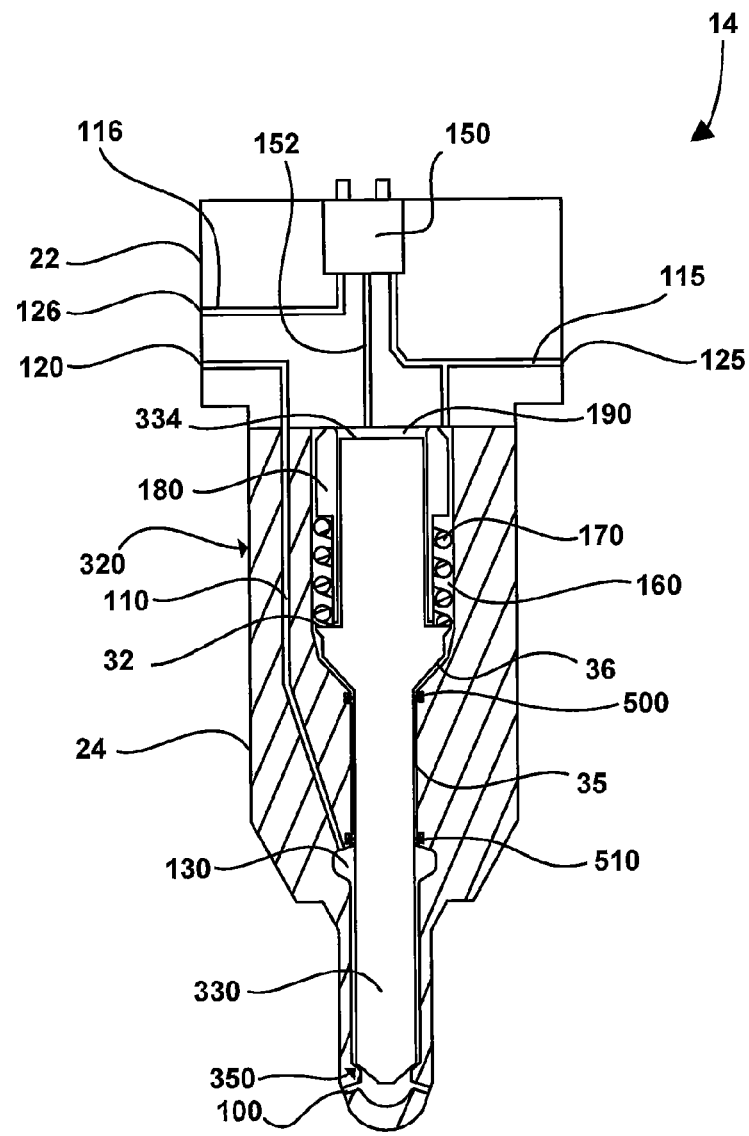
FIG. 7 is a cross-sectional schematic view of a hydraulically actuated gaseous fuel injector that can introduce a gaseous fuel into a combustion chamber of an internal combustion engine according to a fourth embodiment.

Referring now to FIG. 7, hydraulically actuated gaseous fuel injector 14 is illustrated according to a fourth embodiment. Fuel injector 14 is a gaseous fuel injector that employs a hydraulic fluid to move gas needle 330. Gas injection valve 350 is opened by decreasing hydraulic fluid pressure applied to end surface 334 in control chamber 190 such that hydraulic fluid pressure in lift chamber 160 moves gas needle 330 in the same manner as gas injection valve 50 of FIG. 1 is opened. In other embodiments, where the hydraulic fluid is a liquid fuel, the mass flow rate of liquid fuel through match fit 35 can be controlled to deliver a predetermined amount to gas injection valve 350 such that fuel injector 14 operates as a co-injection fuel injector that introduces both the gaseous fuel and the liquid fuel through injection valve 350. The mass flow rate of liquid fuel through match fit 35 can be adjusted by adjusting liquid fuel pressure at inlet 125 and gaseous fuel pressure at inlet 120.

Figure 8:
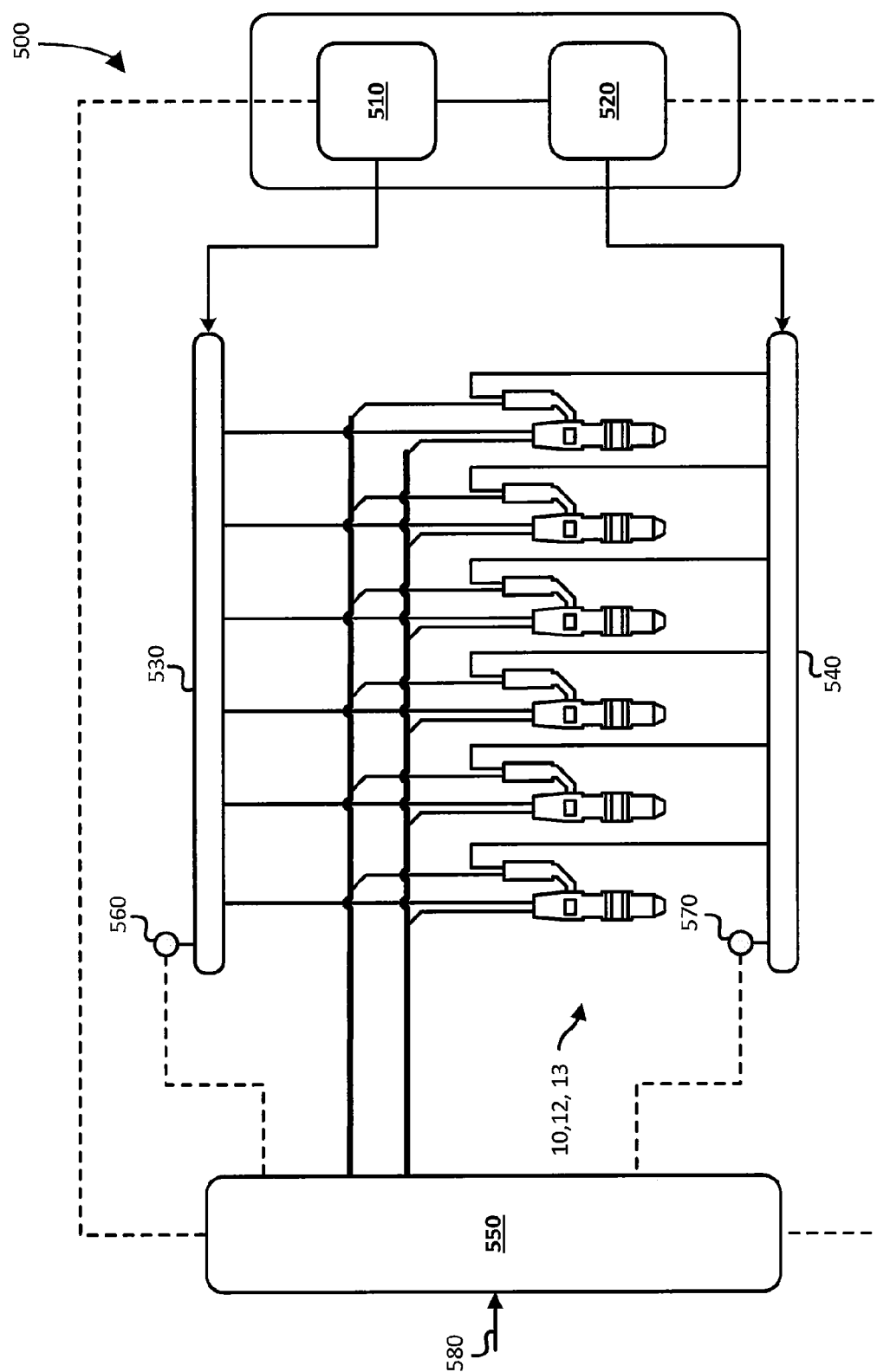
FIG. 8 is a schematic view of an internal combustion engine employing the fuel injectors of FIGS. 1 and/or 5

Referring now to FIG. 8, internal combustion engine system 500 is illustrated in an embodiment that employs fuel injectors 10, 12 or 13 in an operating mode that improves injection of liquid fuel for a majority of engine operating conditions. Engine system 500 includes gaseous fuel supply 510 and liquid fuel supply 520. Gaseous fuel supply 510 stores a gaseous fuel and delivers pressurized gaseous fuel to gaseous fuel rail 530. Liquid fuel supply 520 stores a liquid fuel and delivers pressurized liquid fuel to liquid fuel rail 540. Engine control unit 550 receives signals from sensors 560 and 570 representative of pressure in rails 530 and 540 respectively, and commands fuel supplies 510 and 520 to pressurize the gaseous fuel and liquid fuel in the respective rails accordingly. Engine control unit 550 also receives signals from a variety of other conventional sensors employed in internal combustion engines, as represented by input 580, and commands fuel injectors 10, 12 or 13 to inject gaseous fuel and liquid fuel separately and independently from each other into combustion chambers (not shown) of engine system 500. A predetermined set-point value for liquid fuel pressure in rail 540 is maintained (within a predetermined range of tolerance) at a pressure that is greater than a maximum gaseous fuel pressure in rail 530 across the entire range of engine operating conditions for engine 500. Gaseous fuel pressure in rail 530, on the other hand, is allowed to change as a function of engine operating conditions, for a variety of reasons, such as for improved injection accuracy at low engine load and speed conditions and improved gaseous fuel flow rate at higher engine load and speed conditions. The atomization of liquid fuel as it is injected improves with increased injection pressure, which is directly related to liquid fuel pressure in rail 540. Improved atomization of the liquid fuel improves ignition and combustion of the liquid fuel, and since the liquid fuel is employed as a pilot fuel, when the combustion of the liquid fuel is improved the ignition source for the gaseous fuel improves, resulting in improved combustion performance and efficiency for engine system 500. By employing a hydraulic opening force (from liquid fuel pressure) in injectors 10, 12 and 13, compared to a pneumatic opening force (from gaseous fuel pressure) in previous dual fuel injectors, liquid fuel pressure can remain at the fixed set-point while gaseous fuel pressure can be reduced significantly for improved injection accuracy at low engine load and speed conditions without sacrificing ignition performance of the pilot fuel. In previous dual fuel injectors, there was the possibility that the opening force generated at reduced gaseous fuel rail pressure was not enough to open the gas injection valve when the pressure bias between the liquid and gaseous fuels was too large. In these previous dual fuel injectors, the pressure bias between the gaseous fuel and liquid fuel was required to be maintained within a predetermined range, such that as gaseous fuel pressure was decreased (for improved injection accuracy at low engine load speed conditions) liquid fuel pressure was also decreased to maintain the pressure bias. This resulted in reduced ignition performance.

Figure 9:
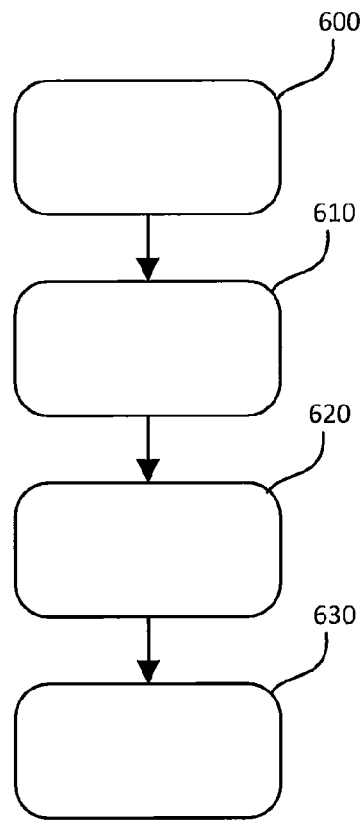
FIG. 9 is a flow chart view of a method for operating the fuel injector of FIG. 1.

Referring now to FIG. 9, a method for operating fuel injectors 10, 12, 13 or 14 is illustrated. In step 600 hydraulic fluid pressure is applied to gas needle 30,330 of gas injection valve 50,350 that contributes to a closing force acting on the gas needle (seen in FIGS. 1, 5, 6 and 7). In step 610, hydraulic fluid pressure is applied to gas needle 30,330 that contributes to an opening force acting on the gas needle. Gas injection valve 50,350 is opened to inject gaseous fuel into a combustion chamber in step 620 by decreasing the hydraulic fluid pressure that contributes to the closing force such that the closing force is less than the opening force and gas needle 30,330 moves to an open position for the gas injection valve. Gas injection valve 50,350 is closed in step 630 by increasing the hydraulic fluid pressure that contributes to the closing force such that the closing force is greater than the opening force and gas needle 30,330 moves to a closed position for the gas injection valve.

Figure 10:
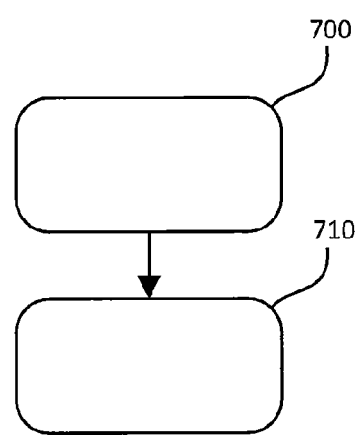
FIG. 10 is a flow chart view of a method of operating the internal combustion engine of FIG. 8.

Referring now to FIG. 10, a method for operating the internal combustion engine of FIG. 8 is illustrated. In step 700, liquid fuel pressure in rail 540 is maintained at a predetermined set-point value within a predetermined range of tolerance across the range of engine operating conditions. In step 710, gaseous fuel pressure is adjusted as a function of engine operating conditions. In an exemplary embodiment, as engine load and speed is decreased gaseous fuel pressure is decreased to improve injection accuracy; and as engine load and speed is increased gaseous fuel pressure is also increased to improve gaseous fuel mass flow rate during injections.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

The invention claimed is:

1. A hydraulically actuated gaseous fuel injector for an internal combustion engine comprising:
    a gaseous fuel inlet;
    an injection valve in fluid communication with the gaseous fuel inlet and comprising a valve member reciprocatable within a fuel injector body between a closed position to block gaseous fuel flow and an open position to allow gaseous fuel flow;
    a hydraulic fluid inlet;
    a lift chamber in fluid communication with the hydraulic fluid inlet whereby hydraulic fluid pressure in the lift chamber acts on the valve member and contributes to an opening force urging the valve member to the open position;
    a control chamber in one of selective fluid communication and restrictive fluid communication with the hydraulic fluid inlet whereby hydraulic fluid pressure in the control chamber acts on the valve member and contributes to a closing force urging the valve member to the closed position;
    a hydraulic fluid outlet; and
    a control valve operable between a blocking position to fluidly isolate the control chamber from the hydraulic fluid outlet, and an injecting position to fluidly connect the control chamber with the hydraulic fluid outlet whereby hydraulic fluid pressure in the control chamber is reduced;
    wherein when the control valve is in the blocking position:
        the control chamber and the lift chamber are in fluid communication with the hydraulic fluid inlet such that the hydraulic fluid pressure in the control chamber is substantially equal to the hydraulic fluid pressure in the lift chamber and the closing force operating on the valve member is greater than the opening force and the gas injection valve is in the closed position,
    and when the control valve is in the injecting position:
        the control chamber is in fluid communication with the hydraulic fluid outlet and the lift chamber is in fluid communication with the hydraulic fluid inlet such that the hydraulic fluid pressure in the control chamber is less than the hydraulic fluid pressure in the lift chamber and the closing force operating on the valve member is less than the opening force and the gas injection valve is in the open position.

2. The hydraulically actuated gaseous fuel injector of claim 1, wherein the gaseous fuel is at least one of biogas, butane, ethane, hydrogen, landfill gas, methane, natural gas, propane, and combinations of these fuels.

3. The hydraulically actuated gaseous fuel injector of claim 1, further comprising a spring biasing the valve member to the closed position.

4. The hydraulically actuated gaseous fuel injector of claim 1, wherein the control valve is a two-way valve between the control chamber and the hydraulic fluid outlet, further comprising a restricted orifice between the hydraulic fluid inlet and the control chamber, wherein when the two-way valve fluidly connects the control chamber with the hydraulic fluid outlet, hydraulic fluid flows out of the control chamber to the hydraulic fluid outlet faster than it flows into the control chamber through the restricted orifice.

5. The hydraulically actuated gaseous fuel injector of claim 1 wherein the control valve is a three-way valve, when the three-way valve is in the blocking position the control chamber is fluidly connected with the hydraulic fluid inlet and fluidly isolated from the hydraulic fluid outlet, and when the three-way valve is in the injecting position the control chamber is fluidly isolated from the hydraulic fluid inlet and fluidly connected with the hydraulic fluid outlet.

6. The hydraulically actuated gaseous fuel injector of claim 1, further comprising one of a solenoid-type actuator and a strain-type actuator for actuating the control valve.

7. The hydraulically actuated gaseous fuel injector of claim 1, further comprising a match fit between the valve member and the fuel injector body extending from the lift chamber to one of a gaseous fuel conduit and a plenum upstream of the gas injection valve, wherein fluid communication between the lift chamber and the one of the gaseous fuel conduit and the plenum is restricted.

8. The hydraulically actuated gaseous fuel injector of claim 7, further comprising an annular seal associated with the match fit that reduces fluid communication through the match fit.

9. The hydraulically actuated gaseous fuel injector of claim 7, wherein the hydraulic fluid is a liquid fuel, and a controlled amount of the liquid fuel is communicated through the match fit for at least one of lubrication and co-injection along with the gaseous fuel.

10. The hydraulically actuated gaseous fuel injector of claim 9, wherein the length of the match fit, an outer diameter of the valve member within the match fit and the clearance between the valve member and the fuel injector body within the match fit are selected for a predetermined pressure differential between liquid fuel pressure in the lift chamber and gaseous fuel pressure upstream from the injection valve whereby the total liquid fuel introduced into the combustion chamber is less than a predetermined value.

11. The hydraulically actuated gaseous fuel injector of claim 3, wherein the spring is disposed in the lift chamber.

12. The hydraulically actuated gaseous fuel injector of claim 11, further comprising an annular sleeve in the lift chamber extending around the valve member of the gaseous-fuel injection valve.

13. The hydraulically actuated gaseous fuel injector of claim 12, wherein the annular sleeve forms an annular match-fit with the valve member, the annular match-fit restricting fluid communication of hydraulic fluid between the control chamber and the lift chamber.

14. The hydraulically actuated gaseous fuel injector of claim 12, the annular sleeve comprising an annular shelf and the valve member comprising an annular shelf, wherein the spring extends between the annular shelf of the annular sleeve and the annular shelf of the valve member.

15. The hydraulically actuated gaseous fuel injector of claim 1, wherein the lift chamber is located around the valve member.

16. The hydraulically actuated gaseous fuel injector of claim 1, wherein the closing force acts on the valve member urging the valve member to the closed position.

* * * * *